United States Patent
Smith et al.

(10) Patent No.: US 11,374,441 B2
(45) Date of Patent: Jun. 28, 2022

(54) NEGATIVE MODULATION SOLUTION FOR FIXED COIL DESIGNS

(71) Applicant: Integrated Device Technology, Inc., San Jose, CA (US)

(72) Inventors: Nicholaus Wayne Smith, La Mesa, CA (US); Chan Young Jeong, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/368,761

(22) Filed: Mar. 28, 2019

(65) Prior Publication Data
US 2019/0386525 A1    Dec. 19, 2019

Related U.S. Application Data

(60) Provisional application No. 62/684,690, filed on Jun. 13, 2018.

(51) Int. Cl.
| | | |
|---|---|---|
| *H02J 50/90* | (2016.01) | |
| *H02J 7/02* | (2016.01) | |
| *H02J 50/12* | (2016.01) | |
| *H02M 7/12* | (2006.01) | |

(52) U.S. Cl.
CPC .............. *H02J 50/90* (2016.02); *H02J 7/025* (2013.01); *H02J 50/12* (2016.02); *H02M 7/12* (2013.01)

(58) Field of Classification Search
CPC ........... H02J 50/90; H02J 50/12; H02J 17/025
USPC ........................................................ 307/104
See application file for complete search history.

(56) References Cited

U.S. PATENT DOCUMENTS

| | | | |
|---|---|---|---|
| 2013/0093256 A1 | 4/2013 | Choi et al. | |
| 2013/0147279 A1* | 6/2013 | Muratov | H02J 50/80 307/104 |
| 2013/0260676 A1* | 10/2013 | Singh | H04B 5/0068 455/41.1 |
| 2014/0145504 A1* | 5/2014 | Kayama | H02J 50/10 307/23 |
| 2014/0266019 A1* | 9/2014 | Pigott | H02J 50/12 320/108 |
| 2017/0201127 A1 | 7/2017 | Jung et al. | |
| 2020/0274402 A1* | 8/2020 | Hwang | H02H 3/20 |

FOREIGN PATENT DOCUMENTS

| | | |
|---|---|---|
| JP | 2013183548 A | 9/2013 |
| JP | 2018078699 A | 5/2018 |

OTHER PUBLICATIONS

Japan Office Action from Japan Application No. 2019-109324, dated May 26, 2020, pp. 1-7.

* cited by examiner

*Primary Examiner* — Michael R. Fin
(74) *Attorney, Agent, or Firm* — Haynes and Boone, LLP (57) ABSTRACT

In accordance with some embodiments of the present invention, a method of controlling and correcting negative modulation is presented. In some embodiments, a method of operating a receiver includes detecting a negative modulation and adjusting one or more parameters to force a transition to a positive modulation. The parameters can be the output voltage Vout, the transmitter input voltage Vin, or receiver structural elements.

8 Claims, 8 Drawing Sheets

NEGATIVE MODULATION SOLUTION FOR FIXED COIL DESIGNS

RELATED APPLICATION

The present disclosure claims priority to U.S. Provisional Patent Application Ser. No. 62/684,690, entitled "Negative Modulation Solution for Fixed Coil Designs by Operating Point Change and Adaptive Impedance Control," filed on Jun. 13, 2018 by the same inventors, which is herein incorporated by reference in its entirety.

TECHNICAL FIELD

Embodiments of the present invention are related to wireless power systems and, specifically, to correcting for negative modulation in fixed coil designs.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

There are multiple different standards currently in use for the wireless transfer of power. The more common standards for wireless transmission of power include the Wireless Power Consortium standard, the Qi Standard. Under the Wireless Power Consortium, the Qi specification, an inductive coupling system is utilized to charge a single device with the receiver coil circuit. Other standards or methods may exist using mutual inductance and coupling to charge mobile devices. In the Qi standard, the receiving device coil is placed in close proximity with the transmission coil while in other standards, the receiving device coil is placed near the transmitting coil, potentially along with other receiving coils that belong to other charging devices.

Typically, a wireless power system includes a transmitter coil that is driven to produce a time-varying magnetic field and a receiver coil that is positioned relative to the transmitter coil to receive the power transmitted in the time-varying magnetic field. Of the issues that arise with wireless power transmission is the need to control the transmitted power while adjusting the frequency output. One important issue that can negatively affect operation of the wireless power transmission system is negative modulation. Negative modulation can occur under various configurations of coils. Negative modulation causes rectified voltage to go negative (or approach 0V) when the communication signal is sent (the stored charge on the rectifier becomes less during communication when negative modulation occurs).

Therefore, there is a need to develop systems that adaptively help to control power and frequency output of a wireless power transmitter that avoids negative modulation.

SUMMARY

In accordance with some embodiments of the present invention, a method of controlling and correcting negative modulation is presented. In some embodiments, a method of operating a receiver includes detecting a negative modulation and adjusting one or more parameters to force a transition to a positive modulation. The parameters can be the output voltage Vout, the transmitter input voltage Vin, or receiver structural elements.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The figures are illustrative only and relative sizes of elements in the figures have no significance. For example, although in FIG. 2 receiver coil 108 is illustrated as smaller than transmitter coil 106, receiver coil 108 may be the same size as transmitter coil 106 or may be smaller, or larger depending on particular systems. Furthermore, inductance changes or coupling changes can also influence negative modulation, which can also can be mitigated according to some embodiments.

Negative modulation occurs in many wireless systems and is a typically caused when the Rx coil inductance is too high or the spacer between the Rx coil and the Tx coil is too small. Other geometric properties can also induce negative modulation, for example mismatches in turns ratio and the relative diameters of Tx and Rx coils. In general, the operating point(s) where negative modulation occurs can be calculated for a given set of parameters and the geometries of the Tx and Rx coils. This can cause coil design delays and, in some cases to meet the end product requirements, the coils cannot be designed in a way that eliminates negative modulation in each expected circumstance.

Negative modulation is a problem because it couples into the Rx output and causes voltage drops that can generate oscillations, interfere with communications signals, and effect system stability. In extreme cases causes wireless charging disconnects or battery charging interruptions may occur.

Figure 1:
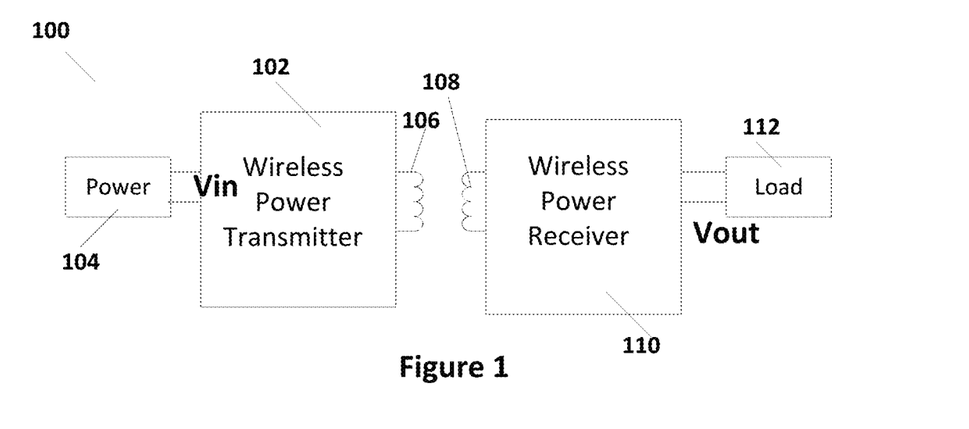
FIG. 1 illustrates a wireless power transmission system.

FIG. 1 illustrates a system 100 for wireless transfer of power. As illustrated in FIG. 1, a wireless power transmitter 102 drives a coil 106 to produce a magnetic field. A power supply 104 provides the input voltage Vin to wireless power transmitter 102. Power supply 104 can be, for example, a battery-based supply or may be powered by alternating current for example 120V at 60 Hz. Wireless power transmitter 102 drives coil 106 at, typically, a range of frequencies, typically according to one of the wireless power standards. However, this could be applicable to any frequency where it is practical to transfer power and/or information by means of magnetic coils irrespective of any standard that may exist.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium, the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards. In Europe, the switching frequency has been limited to 148 kHz for electromotive interference (EMI) compliance easement.

As is further illustrated in FIG. 1, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification to convert the received AC power to DC power for load 112.

Figure 2A:
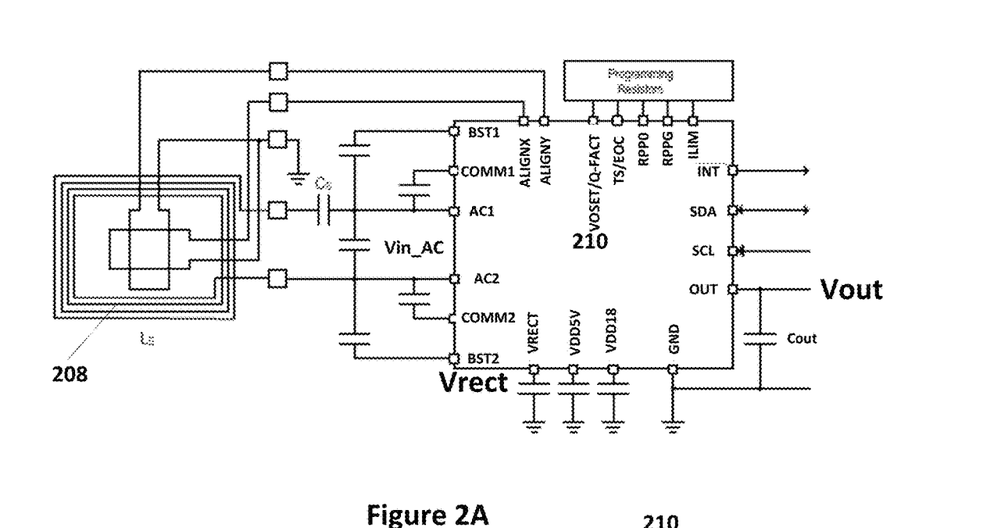
FIGS. 2A, 2B, and 2C illustrate a wireless power receiver according to some embodiments.
Figure 2B:
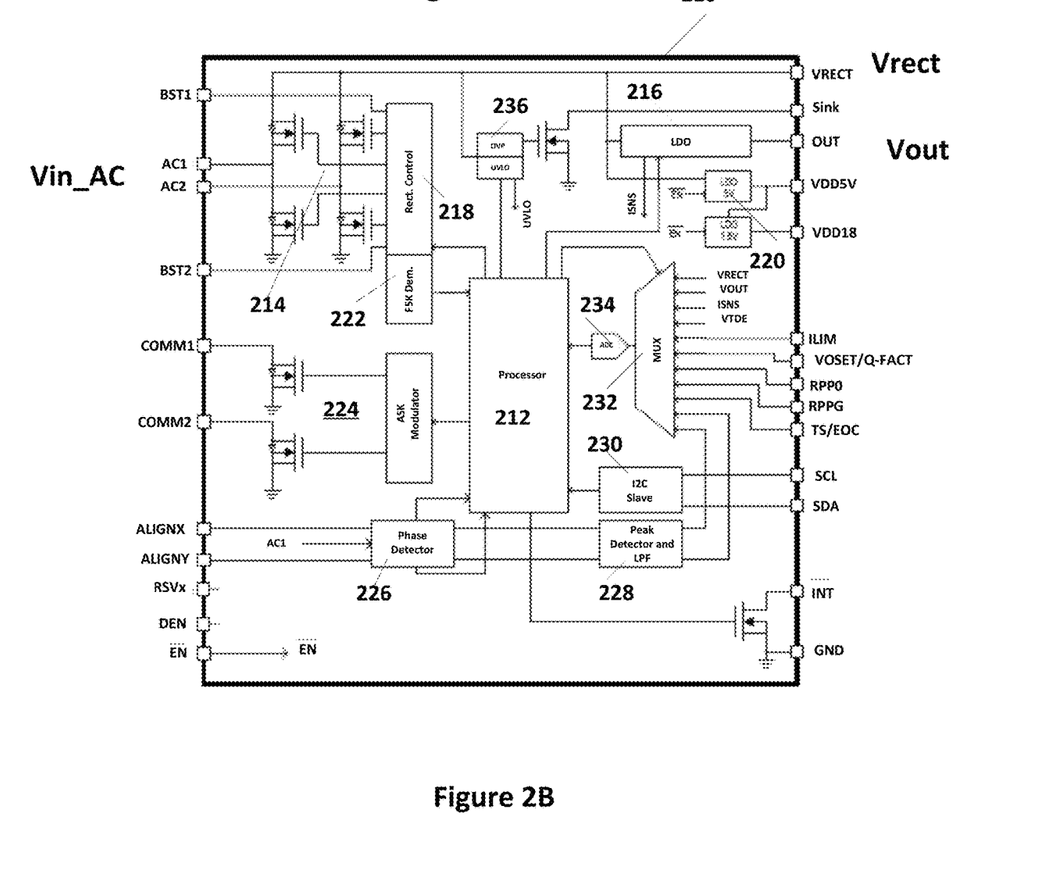

FIGS. 2A and 2B illustrate in more detail an example receiver unit. As illustrated in FIG. 2A, a receiver 210 is coupled to a receiver antenna 208, which provides an input voltage VIN between nodes AC1 and AC2. Receiver 210 can be, for example, a single integrated circuit (the IDT P9221-R, for example) that receives and rectifies wireless power. Receiver 210 produces a rectified signal Vrect and an output voltage Vout, which can be coupled to load such as load 112. Receiver 210 can include a processor that performs processing that controls the operation of wireless power receiver and also limits or removes negative modulation.

FIG. 2B illustrates more detail of receiver 210. As illustrated in FIG. 2B, the input voltage Vin is received in a rectifier 214 from receive coil 208. Rectifier circuit 214 is a full-bridge rectifier formed by four transistors controlled by a rectifier controller 218. Rectifier controller 218 is controlled by a processor 212 such that the wireless power signal received from receive coils 208 is efficiently rectified. As such, rectifier circuit 214 generates the rectified voltage Vrect. In some embodiments, as illustrated, an over-voltage protection circuit 236 can provide over-voltage protection to receiver IC 210.

A regulator 216 produces the output voltage Vout from Vrect. Regulator 218 may, as illustrated here, be a low dropout regulator (LDO) as illustrated. In some embodiments, regulator 218 may include buck or boost circuits to provide the output voltage Vout. Other LDO regulators 220 may produce other signals, for example 5V or 1.8V or even higher voltages, for operation of internal circuitry, output as output pins VDD5V and VDD18 illustrated here.

As is further illustrated in FIG. 2B, a frequency shift key (FSK) demodulator 222 can be provided. FSK demodulator 222 receives the Vin signal and demodulates any FSK modulated data provided on the wireless power signal received by receive coils 208. The demodulated data is provided to processor 212. Similarly, an amplitude shift key (ASK) modulator 224 can be coupled to processor 212. ASK modulator 224 transmits data received from processor 212 as an amplitude modulated signal on the wireless power signal. The amplitude modulation is provided between pins COMM1 and COMM2, which as illustrated in FIG. 2A can be coupled through capacitors to AC1 and AC2. The processor may be replaced by a state machine, analog circuit, or other digital circuit used as a signal processor capable of making decisions based on the message.

Further, several analog signals, including VRECT and VOUT, are input through a multiplexor 232 and an analog-to-digital converter (ADC) 234 to processor 212. Other signals include the output from peak detector and low-pass filter (LPF) 228, the output from phase detector 226, temperature sensor and end of charge indicator (TS/EOC) as well as other signals. Processor 212 receives each signal by selecting the particular signal for digital conversion in multiplexer 232.

The circuitry of receiver 210 is controlled by a processor unit 212, which includes a processor and memory to hold data and programming. In the example where receiver circuit 212 is an IDT P9221-R receiver IC, then processor 212 can be a 32-bit ARM processor. Processor unit 212, among other things, is coupled to monitor the output voltage Vout, the rectified voltage Vrect, and the input voltage Vin_AC to control operation of rectifier 214 and regulator 216. In particular, according to some embodiments, processor unit 212 can detect negative modulation and adjust the output voltage Vout, the transmitter input voltage Vin, or the voltage Vin_AC in order to limit or reduce the negative modulation. As discussed further below, Vin_AC can be adjusted by adjusting the capacitances coupled to AC1 and AC2. The transmitter voltage Vin can be adjusted by sending instruction using ASK communication or other Out-of-Band communications to the Tx to request its input voltage to be changed. Other techniques may be to request frequency changes in the transmitter using control error packets or other applicable methods used to adjust the system operating point. The output voltage Vout can be adjusted by controlling the operation of LDO 216. Negative modulation can be detected by monitoring the values of Vrect or Vin to determine the phase of the modulation or detect the voltage change on Vrect during communication. Processor 212 can then adaptively detect and respond to negative modulation as further described below. In some embodiments, the negative modulation can also be characterized through testing and a configuration of coils and components can be created as a fixed solution based around typical conditions where negative modulation is observed.

Processor 212 can be any processor that can operate stored instructions to execute embodiments of the present invention. In particular, processor 212 includes the processor or microcomputer, memory, and other circuitry. Processor 212 can, therefore, execute instructions stored in the memory to detect negative modulation on the rectified voltage Vrect and to adjust either the transmitter input voltage Vin, the AC voltage induced by the magnetic field Vin_AC, or the output voltage Vout until a positive modulation is detected. As discussed further below, the output voltage Vout can be adjusted by adjusting the operation of regulator 216. The input voltage Vin_AC can be adjusted by adjusting the capacitance coupled to nodes AC1 and AC2.

Figure 2C:
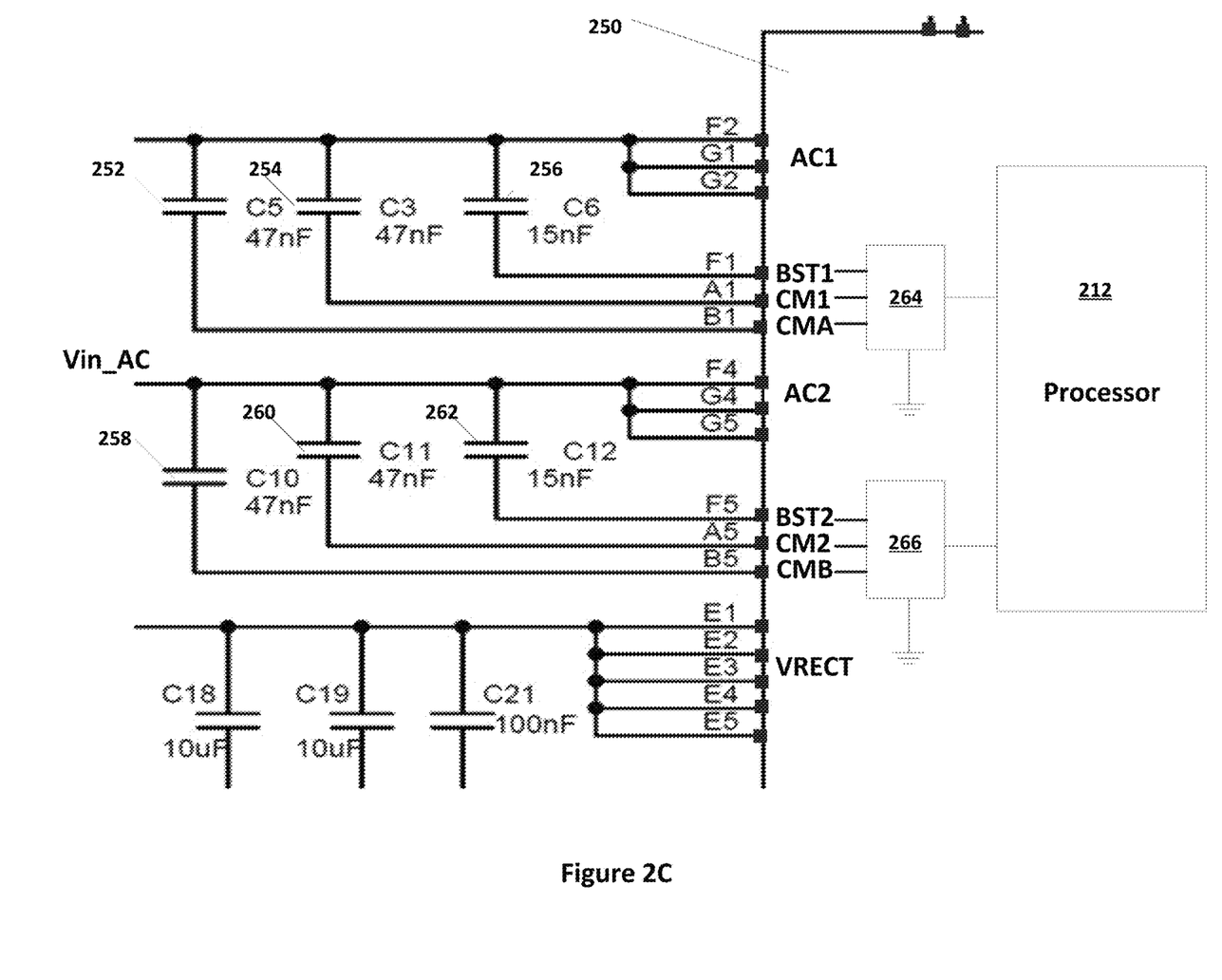

FIG. 2C illustrates an embodiment with a receiver circuit 250. Receive circuit is similar to receive circuit 210 illustrated in FIGS. 2A and 2B, with further pins as described below to provide control for the input voltage Vin_AC across AC1 and AC2 better. As illustrated in FIG. 2C, a capacitor 252 (C5) is coupled between AC1 and CMA, capacitor 254 (C3) is coupled between AC1 and CM1, and capacitor 256 (C6) is coupled between AC1 and BST1. Similarly, capacitor 258 (C10) is coupled between AC2 and CMB, capacitor C11 is coupled between AC2 and CM2, and capacitor C12 is coupled between AC2 and BST2. Any number of capacitors can be coupled between AC1 or AC2 and corresponding input terminals.

As is further illustrated in FIG. 2C, the nodes BST1, CM1, and CMA are coupled to a driver circuit 264 that is controlled by processor 212. Similarly, nodes BST2, CMS, and CMB are coupled to driver circuit 266 that is controlled by processor 212. Driver circuit 264 and driver circuit 266 can be configured to couple CM1, CMA, CM2, and CMB to voltages. For example, driver circuit 264 and driver circuit 266 can include FETs configured to selectively couple BST1, CM1, CMA, BST2, CM2, and CMB to ground in response to control signals from processor 212. As discussed above, capacitor driver circuits 264 and 266 can be configured to drive any number of capacitors coupled between inputs AC1 and AC2, respectively.

In particular, processor 212 can control driver circuit 264 and driver circuit 266 to modify the capacitive inputs to AC1 and AC2 to better control the input voltage Vin_AC. In particular, adjustment capacitor 252 (C3) and capacitor 254 (C5) on the input to AC1, which are coupled to inputs CM1 and CMA, respectively, can be selectively engaged. Similarly, capacitor 258 (C10) and capacitor 260 (C11) on the input to AC2, which are coupled to inputs CM2 and CMB, respectively, can be engaged. As discussed above, signals at CM1, CMA, CM2, and CMB can be provided to adjust the input voltage Vin_AC across AC1 and AC2. These capacitors are typically used to transmit data messages from the receiver to the transmitter, as illustrated in FIGS. 2A and 2B. The number of these capacitors (more importantly the magnitude of the capacitance value) used to transmit the data messages has an impact on the modulation depth (the amount of Vrect voltage change) and consequently can be used to affect the Vrect modulation.

Figures 3A, 3B, 3C:
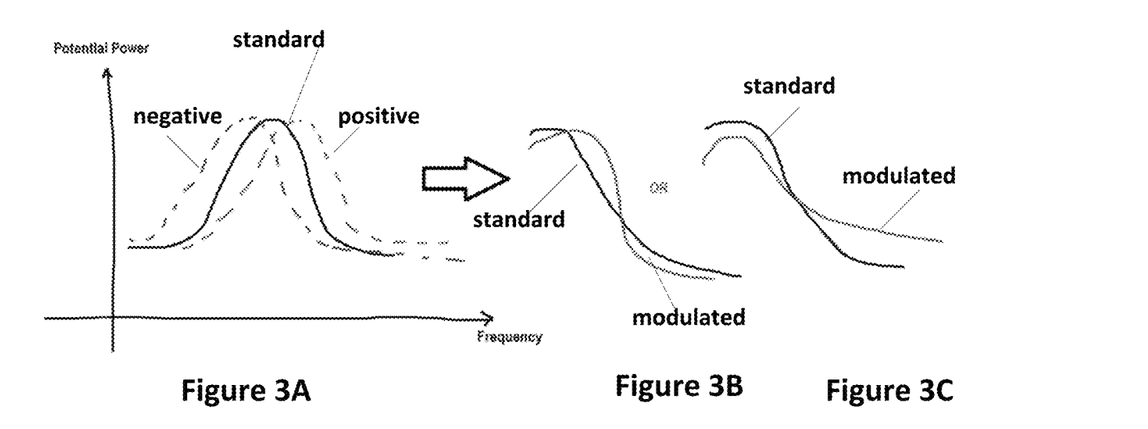
FIGS. 3A, 3B, and 3C illustrate typical power curves for negative modulation, standard modulation, and positive modulation.

FIG. 3A illustrates typical power curves (Resonance tank potential power as a function of frequency) comparing the power curve for negative modulation, positive modulation, and standard operation. As is illustrated, the negative modulation may peak at a lower frequency than does the standard or positive modulation case. These curves are a function of coil design, coupling factor, impedance changes, and operating frequency point as well as magnetic properties of the Tx and Rx coils used by the system.

FIGS. 3B and 3C illustrate crossovers in the potential power curve between a modulated signal and the standard signal. In FIG. 3B, the modulated signal crosses the standard curve in two places. In FIG. 3C, the example modulated curve crosses the standard curve once.

Figure 4:
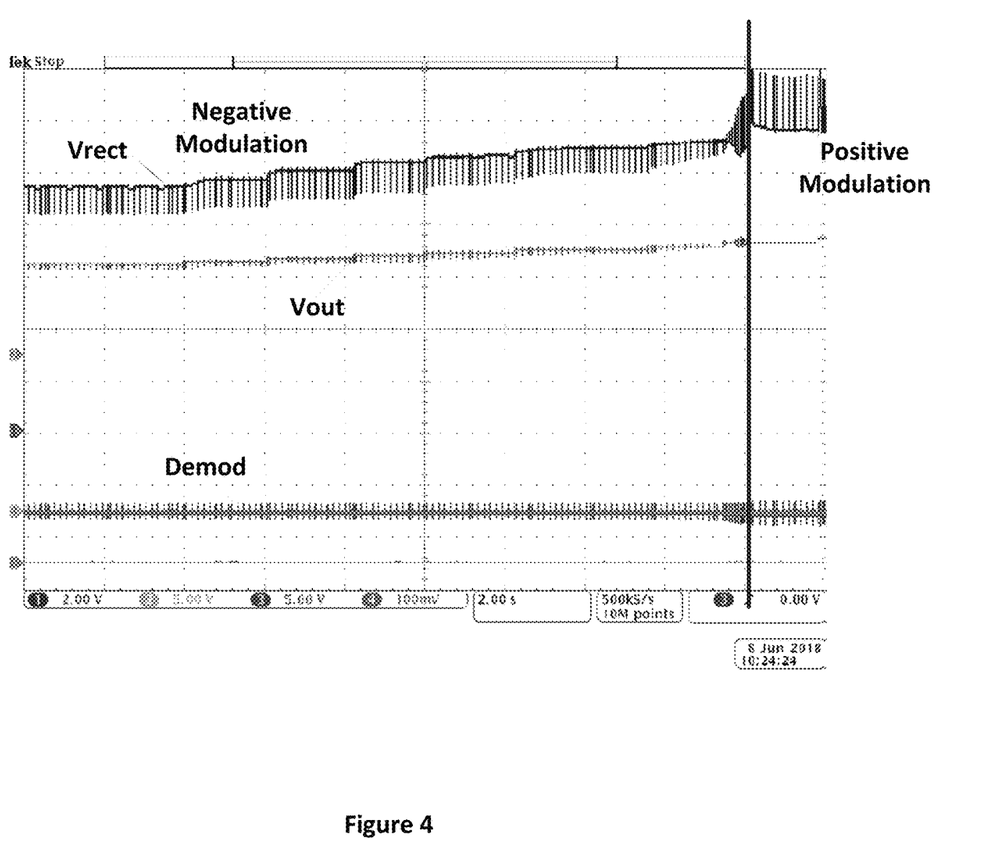
FIG. 4 illustrates an example of the switch from negative modulation to positive modulation under light load.

Negative modulation can be observed as a function of Vout for fixed Vin, coils, and spacing. These parameters appear to correlate with the negative modulation as a function of load. It is apparent that negative modulation can be limited or improved by increasing Vout in some cases (or decreasing Vout in others). This feature is illustrated in FIG. 4, where Vrect illustrates a negative modulation until Vout reaches a certain level. Then Vrect illustrates a positive modulation. FIG. 4 illustrates Vrect, Vout, and the demodulation signal Demod while Vout is increased so that Vrect moves from a negative modulation to a positive modulation.

Figure 5:
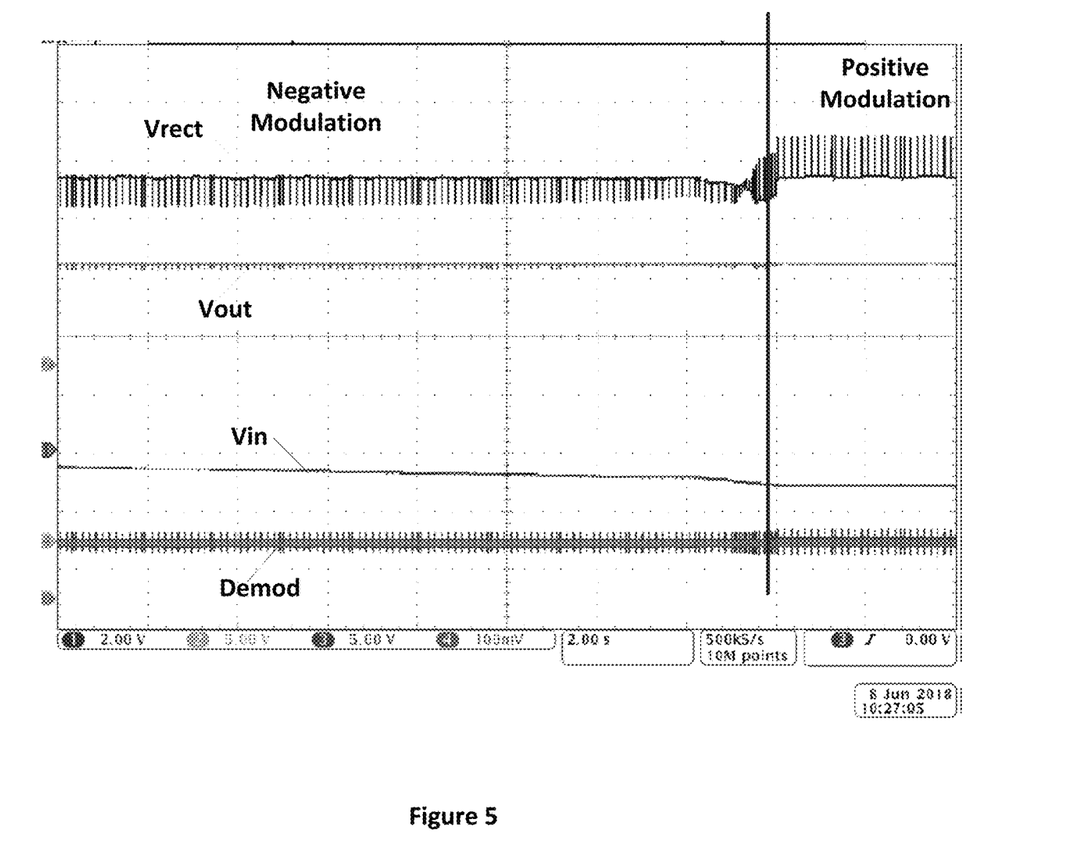
FIG. 5 illustrates a switch from negative modulation to positive modulation.

FIG. 5 indicates a situation where Vin is adjusted, which also causes Vrect to switch from a negative modulation scheme to a positive modulation scheme. As shown in FIG. 5, Vout is held constant while the transmitter Vin is reduced, for example sending communication messages through or outside the wireless line requesting the transmitter to adjust the DC voltage being applied to the full-bridge inverter 102 used to generate an AC signal in the TX coil 106. In some embodiments, the transmitter pad output voltage can also be used to adjust the receiver input voltage Vin out to correct for negative modulation by adjusting signals to capacitors capacitor 254 (C3), capacitor 252 (C5), capacitor 258 (C10), and capacitor 260 (C11) as illustrated in FIG. 2C or. FIG. 5 illustrates Vrect, Vout, Vin, and Demod while Vin is decreased to move Vrect from a negative modulation to a positive modulation. In this case, Vout is held constant.

Figure 6:
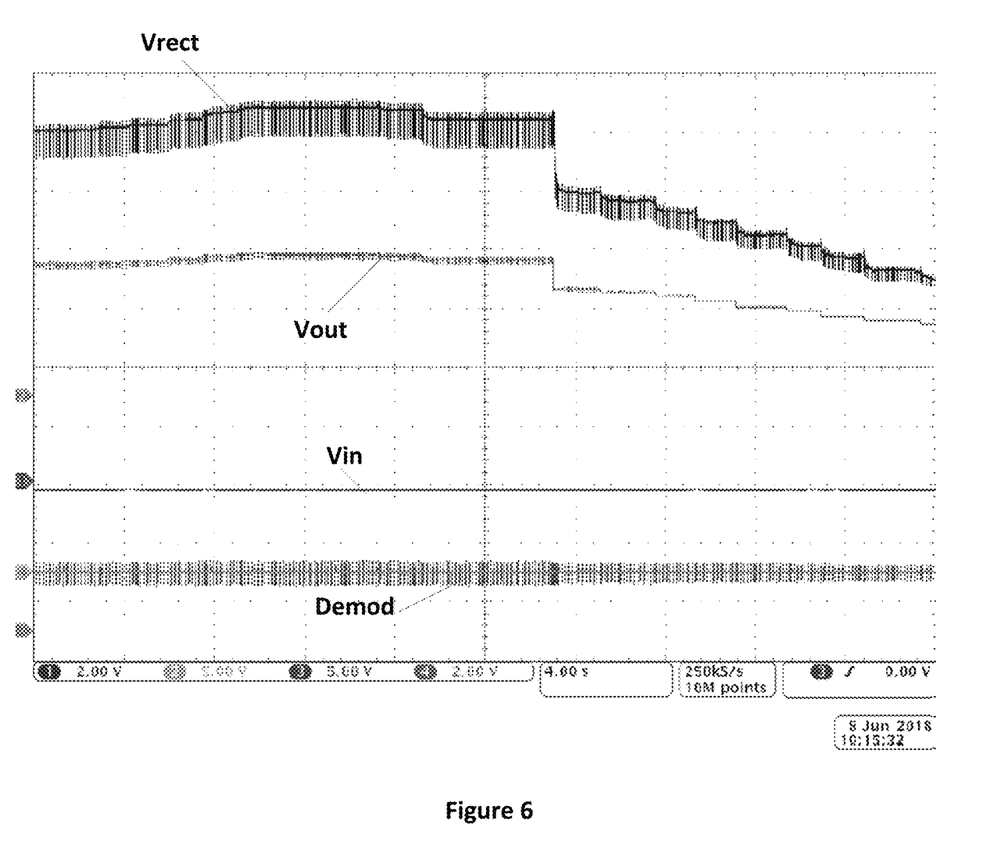
FIG. 6 illustrates step reduction of negative modulation.

FIG. 6 illustrates Vrect, Vout, Vin, and Demod as Vin is held constant and Vout is adjusted stepwise. Although Vrect continues to illustrate negative modulation, with each step of decrease illustrated in Vout, the amplitude of the modulation decreases and Vrect decreases in voltage.

Figure 7A:
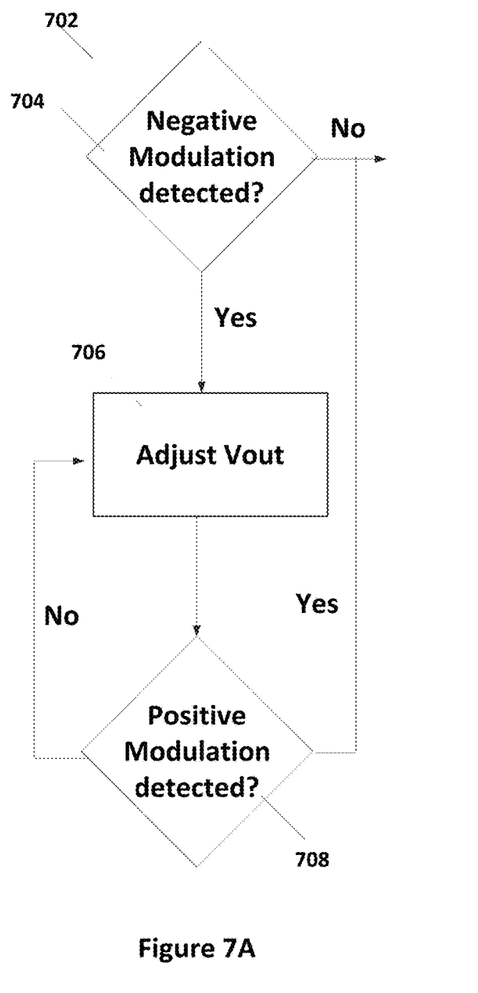
FIGS. 7A, 7B, and 7C illustrate a flow chart for operation of the wireless power receiver such as that illustrated in FIGS. 2A, 2B, and 2C to affect negative modulation.
Figure 7B:
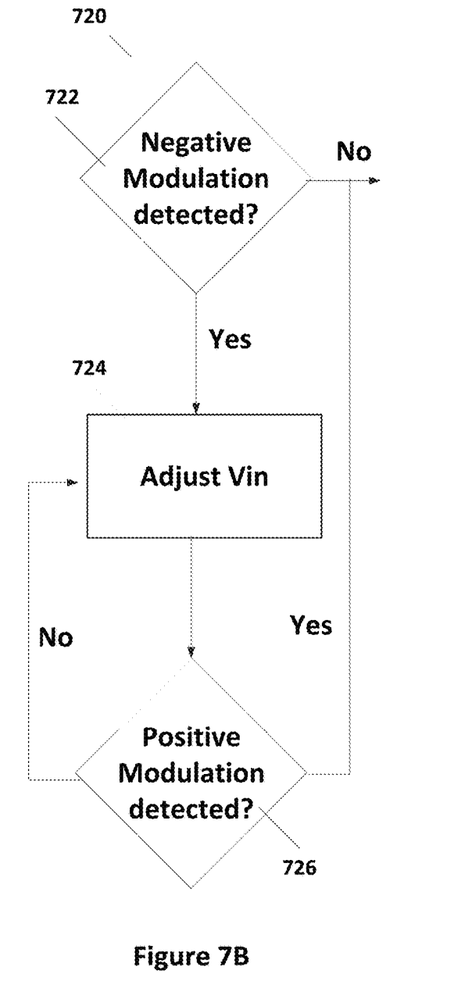
Figure 7C:
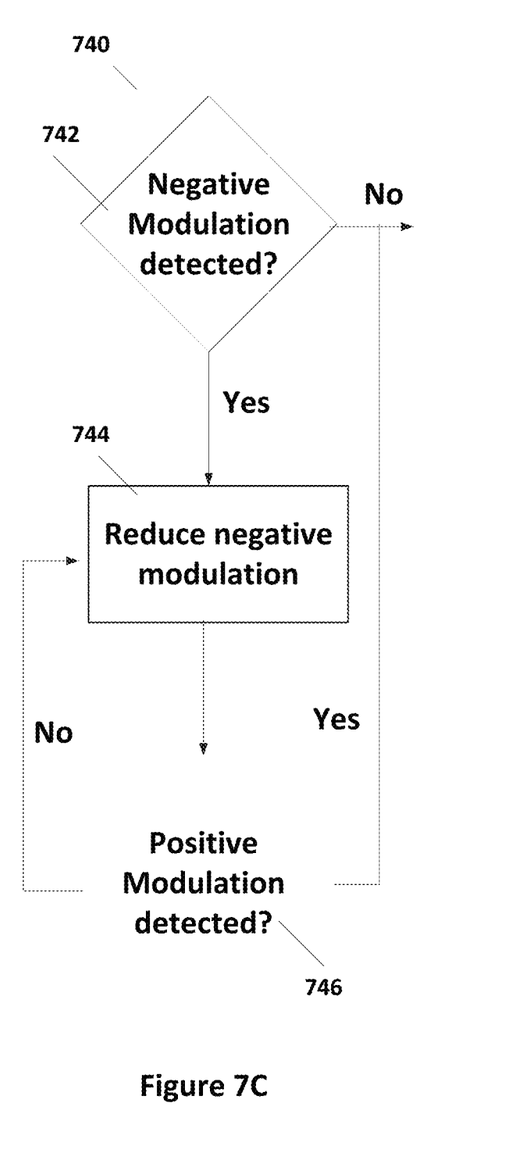

The negative modulation problem can be solved in firmware executed by processor 212. Algorithms that can be executed by processor 212 or other circuits designed to react to negative modulation are illustrated in FIGS. 7A, 7B, and 7C. FIG. 7A illustrates an algorithm 702 that corrects for negative modulation by adjusting the output voltage Vout. FIG. 7B illustrates an algorithm 720 that corrects for negative modulation by adjusting the transmitter input voltage Vin. FIG. 7C illustrates an embodiment where the voltage Vin_AC is adjusted as illustrated in FIG. 2C. In either algorithm, the negative modulation can be changed to a positive modulation in wireless power system. For a fixed Vin system with variable frequency, algorithm 702 can be executed to adjust Vout. For a fixed Vout, algorithm 722 can be executed to adjust transmitter Vin. Either algorithm 702 or algorithm 720 can be executed to solve negative modulation on variable voltage fixed frequency design. In some cases, the negative modulation can be solved by keeping both VOUT and VIN at the same levels and using one or more communication capacitors (capacitors 252, 254, 258, 260) to send the modulation signal, thus altering the communication signal strength and impact the modulation magnitude. In other cases, internal FETs or resistor may be used to send modulation signals and variation in the magnitude of these resistive signal can also be used to correct negative modulation.

FIG. 7A illustrates algorithm 702 that can be executed by processor 212. As illustrated, algorithm 702 starts at step 704, where a negative modulation is detected. When a negative modulation is detected, then algorithm 702 proceeds to step 706. In step 706, processor 212 adjusts the output voltage Vout. As discussed above, processor 212 can adjust the output voltage Vout by adjusting the operation of regulator 216 or by requesting an operational frequency shift in transmitter 102. From step 706, algorithm 702 proceeds to step 708. In step 708, if a positive modulation is detected the algorithm exits. If a negative modulation is still present, the algorithm 702 proceeds to step 706 to provide further adjustments to the output voltage Vout.

FIG. 7B illustrates algorithm 720 according to some embodiments. As illustrated in FIG. 7B, algorithm 720 starts in step 722. In step 722, negative modulation is detected by processor 212. If no negative modulation is detected, then algorithm 720 exits. However, if negative modulation is detected in step 722, then algorithm 720 proceeds to step 724. In step 724, the input voltage Vin is adjusted. As discussed above, the input voltage can be adjusted, for example, by transmitting a request to transmitter 102. From step 724, algorithm 720 proceeds to step 726. In step 726, algorithm 720 determines whether or not a positive modulation has been achieved. If not, then algorithm 720 can return to step 724 to further adjust the input voltage Vin. If a positive modulation has been achieved, then algorithm 720 can exit.

FIG. 7C illustrates an algorithm 740 according to some embodiments. As illustrated in FIG. 7C, algorithm 740 detects a negative modulation in step 742. If no negative modulation is detected, then algorithm 740 exits. If a negative modulation is detected, algorithm 740 proceeds to step 744. In step 744, the capacitance coupled to nodes AC1 and AC2, Vin_AC, can be adjusted as discussed with respect to FIG. 2C. In some embodiments, internal FETs or resistors can be adjusted to send modulation signals that can be used to correct the negative modulation. Algorithm then proceeds to step 746. In step 746, algorithm 740 then detects a positive modulation. If positive modulation is detected, then algorithm 740 exits. If the positive modulation is not detected, then algorithm 740 returns to step 744.

The algorithms illustrated in the flow charts of FIGS. 7A, 7B, and 7C allow for adjustments of either Vout, Vin, or internal parameters when a negative modulation on the signal Vrect received by the rectifier is detected. In some embodiments, both Vout and Vin can be adjusted when negative modulation is detected to achieve a positive modulation. As such, in FIGS. 7A and 7B, negative modulation is detected as occurring, and if so the Rx output voltage is adjusted or the Tx input voltage is adjusted to force an operating point change from the Tx until the modulation becomes positive. The negative modulation problem can also be solved in hardware as is illustrated in FIG. 7C, but not all designs can support the necessary requirement to support the hardware solution. Other solutions may involve using characterization data to observe and save to memory specific operating points where negative modulation occurs and to add algorithm to adjust the operating points (Vin, Vout, or modulation magnitude).

The above detailed description is provided to illustrate specific embodiments of the present invention and is not intended to be limiting. Numerous variations and modifications within the scope of the present invention are possible. The present invention is set forth in the following claims.

What is claimed is:

1. A method of operating a receiver of wireless power, comprising:
   detecting a negative modulation when a communication signal is present in a wireless power signal received by the receiver; wherein the detecting of the negative modulation is performed by measuring a decreasing rectifier voltage from a rectifier circuit receiving the wireless power signal, wherein the decreasing voltage is due to the communication signal; and
   adjusting a receiver output voltage from a regulator coupled to the rectifier circuit to force a transition to a positive modulation, the positive modulation determined by an increasing voltage rectifier voltage due to the communication signal.

2. The method of claim 1, wherein adjusting the receiver output voltage includes adjusting operation of the regulator coupled between the rectifier circuit and the receiver output voltage.

3. The method of claim 1, wherein the parameter is the transmitter input voltage of a transmitter.

4. The method of claim 3, wherein adjusting the transmitter input voltage includes communicating with the transmitter to reduce the transmitter input voltage.

5. A wireless power receiver, comprising:
   a rectifier circuit coupled between a first input and a second input, the first input and the second input configured to receive an input voltage from a receive coil that receives a wireless power signal, the rectifier circuit providing a rectifier voltage;
   a regulator coupled to the rectifier circuit to receive the rectifier voltage and provide an output voltage; and
   a processor coupled to the rectifier circuit and the regulator, the processor configured to detect a negative modulation from the rectifier voltage in the presence of a communication signal and, when the negative modulation is detected, to adjust an operating voltage from the regulator until a positive modulation is detected on the rectifier voltage,
   wherein the negative modulation is detected by determining that the rectified voltage decreases when the communication signal is present,
   wherein the positive modulation is detected by determining that the rectified voltage increases when the communication signal is present, and
   wherein the operating voltage is the output voltage and the processor adjusts the output voltage by adjusting parameters in the regulator.

6. The wireless power receiver of claim 5, further including communicating with a transmitter to adjust a transmitter input voltage.

7. The wireless power receiver of claim 5, comprising:
   one or more first capacitors coupled between the first input and a capacitor driver; and
   one or more second capacitors coupled between the second input and the capacitor driver,
   wherein the processor controls the capacitance coupled to the first input and the second input through the capacitor driver to provide a positive modulation on the rectifier voltage.

8. A wireless power receiver, comprising:
   means for receiving wireless power and providing an output voltage from a regulator;
   means for detecting a negative modulation on the wireless power by measuring a rectified voltage decreasing when a communication signal is present; and
   means for adjusting the output voltage from the regulator to transition to a positive modulation on the wireless power when the negative modulation is detected,
   wherein the positive modulation is detected when the rectified voltage increases when the communication signal is present.

* * * * *